United States Patent [19]

Weiss et al.

[11] Patent Number: 5,896,084
[45] Date of Patent: Apr. 20, 1999

[54] TAIL LIGHT ASSEMBLY FOR MOTOR VEHICLES

[75] Inventors: Achim Weiss, Oberderdingen; Winfried Hardy Gauch, Magstadt, both of Germany

[73] Assignee: Reitter & Schefenacker GmbH & Co. KG, Esslingen, Germany

[21] Appl. No.: 08/980,501

[22] Filed: Dec. 1, 1997

[30] Foreign Application Priority Data

Aug. 12, 1997 [DD] German Dem. Rep. .......... 197 34 750

[51] Int. Cl.[6] ........................................ B60Q 1/26
[52] U.S. Cl. .................... 340/468; 340/469; 340/475; 340/479
[58] Field of Search .................... 340/464, 468, 340/469, 475, 479, 465, 636, 663, 463, 466, 467; 307/10.8

[56] References Cited

U.S. PATENT DOCUMENTS

| | | | |
|---|---|---|---|
| 4,232,680 | 11/1980 | Hudlesonm et al. | 128/422 |
| 4,631,516 | 12/1986 | Clinker | 340/464 |
| 4,924,343 | 5/1990 | Niemi | 361/98 |
| 5,001,398 | 3/1991 | Dunn | 340/468 |
| 5,053,746 | 10/1991 | Taneo | 340/468 |
| 5,184,056 | 2/1993 | Brune et al. | 318/799 |
| 5,352,956 | 10/1994 | Doss | 315/224 |
| 5,463,370 | 10/1995 | Ishikawa et al. | 340/464 |
| 5,644,290 | 7/1997 | Rhodes | 340/479 |
| 5,661,645 | 8/1997 | Hochstein | 363/89 |
| 5,663,707 | 9/1997 | Bartilucci | 340/464 |

Primary Examiner—Jeffery A. Hofsass
Assistant Examiner—Van T. Trieu
Attorney, Agent, or Firm—Robert W. Becker & Associates

[57] ABSTRACT

A tail light assembly for a motor vehicle, including a rear light, a brake light, and a turn signal light, wherein at least one of the rear light, the brake light, and the turn signal light is comprised of LEDs, has a control device for operating the LEDs at a constant current for a given voltage range.

13 Claims, 3 Drawing Sheets

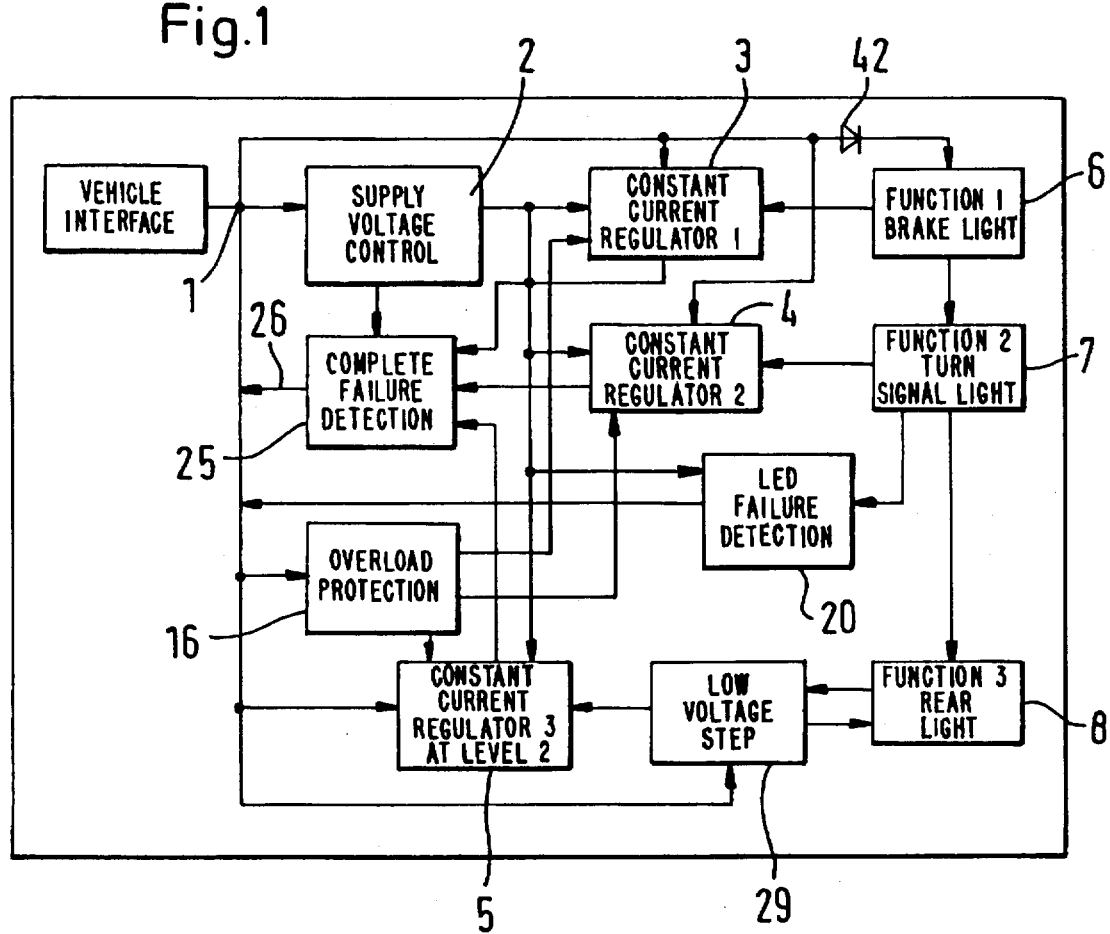
Fig.1
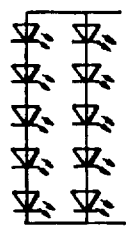
Fig.2a
Fig.2b
Fig.2c
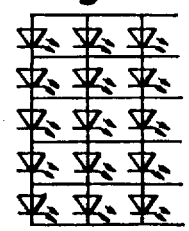
Fig.2d
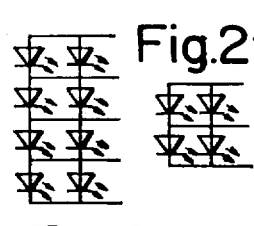
Fig.2e
Fig.2f

TAIL LIGHT ASSEMBLY FOR MOTOR VEHICLES

BACKGROUND OF THE INVENTION

The present invention relates to a tail light assembly for motor vehicles having a brake light, a turn signal light, and a rear light.

LED lights have only been used for brake lights in motor vehicles in the area of the rear window. The adaptation of the LEDs to the vehicle voltage is realized with resistors. In certain operating conditions this can lead to over voltage and temperature overload of the LEDs. The result of such overload can be a decrease in light output luminosity or even complete failure or a change in the color being emitted.

It is therefore an object of the present invention to embody the inventive tail light assembly such that under any operating condition of the motor vehicle the tail light assembly operates reliably.

SUMMARY OF THE INVENTION

The tail light assembly for a motor vehicle according to the present invention is primarily characterized by:

A rear light, a brake light, and a turn signal light, wherein at least one of the rear light, brake light, and the turn signal light is comprised of LEDs;

A control device for operating the LEDs at a constant current for a given voltage range.

Advantageously, the control device comprises a measurement transducer that is preferably a measurement resistor.

The control device may comprise a current regulator including a comparator for comparing nominal current value to an actual current value.

The current regulator has a control member controlled by the comparator.

The control member is preferably a MOSFET.

The current regulator is switchable to at least two current intensity levels.

The control device may comprise resistors for switching the at least two current intensity levels.

The control device may further include an overvoltage protection device whereby the over voltage protection device comprises preferably a control member that switches when a voltage limit is surpassed.

The control member may be a transistor.

The control device may comprise a failure detection device that compares a nominal current value to an actual current value of the current regulator.

The overvoltage protection device is preferably connected upstream of the current regulator and the control member switches the current regulator into a base state when the voltage limit is surpassed.

The LEDs are preferably arranged as an LED matrix.

The control device may further comprise a LED failure detection member detecting the failure of an LED by measuring a voltage drop.

The voltage drop may be measured across both halves of the LED matrix.

The failure detection member may comprise a comparator comparing the nominal voltage value to an actual voltage value.

The control device may also comprise a low voltage member for switching, when triggered, the LED matrix of a predetermined number of LEDs to a sub-matrix of half the predetermined number of LEDs.

The low voltage member has a relay for switching.

The control device is supplied with a control signal from an on-board computer, with all components of the control device being supplied with voltage derived from the control signal, wherein a resting current is less than or equal to 1 mA.

In the inventive tail light assembly, at least one of the lights, preferably all lights, are comprised of LEDs. The operating current of the LEDs is maintained substantially constant over a certain voltage range. Thus, no current overload and/or temperature overload of the LEDs will occur. Their light output (luminosity) thus remains substantially constant over the entire service life. Also, no change of the emitted color will occur.

BRIEF DESCRIPTION OF THE DRAWINGS

The object and advantages of the present invention will appear more clearly from the following specification in conjunction with the accompanying drawings, in which:

FIG. 1 is a circuit diagram of the inventive control device for LEDs;

FIGS. 2a to 2f show different switching examples for LEDs combined in a matrix;

DESCRIPTION OF PREFERRED EMBODIMENTS

The present invention will now be described in detail with the aid of several specific embodiment utilizing FIGS. 1 through 7.

The control device for operating the tail light assembly of a motor vehicle is designed for use of lights having LEDs. With this control device a constant light output (luminosity) of LEDs, preferably over the entire voltage range, is achieved.

Figure 5:
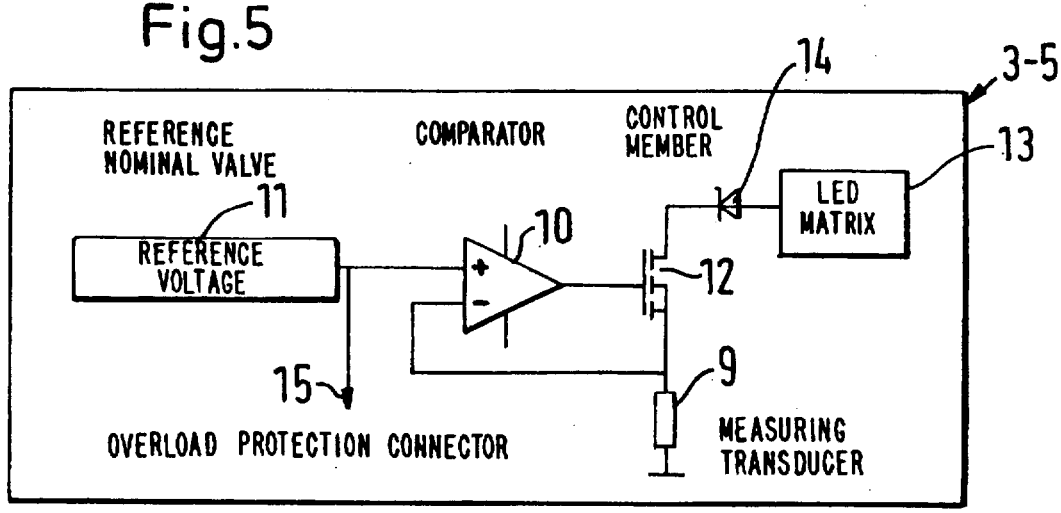
FIG. 5 shows the diagram of a constant current regulator of the inventive control device according to FIG. 1.

The control device has an interface 1 (FIG. 1) via which the control electronics of the onboard electrical system (onboard computer) of the motor vehicle receives a control signal. It activates the control device with which the coordinated LEDs are controlled. The interface 1 has connected thereto a supply voltage control 2 with which the signal is supplied to the interface 1. The supply voltage control 2 is embodied such that its resting current is smaller than or equal to 1 mA. Downstream of the supply voltage control 2, constant current regulators 3 to 5 are arranged which are connected to the control 2 by a diode 42. The constant current regulator 3 is connected to the brake light 6, the constant current regulator 4 is connected to the turn signal light 7, and the constant current regulator 5 is connected to the rear light 8. The constant current regulators 3 through 5 are of identical design and measure the current at a measuring transducer or measuring resistor 9 (FIG. 5). The measured resistance is compared by a comparator 2 to a reference voltage 11. The output signal of the comparator 10 is supplied to a control member 12 that is preferably a MOSFET. An LED matrix 13 is controlled by the control member 12 with interposition of a protective diode 14. The control device monitors the voltage of the onboard electrical voltage. When a predetermined voltage limit $U_{max}$ is surpassed, the constant current regulators 3 to 5 are switched into a defined safe state in order to protect the control member 12 form overload. The constant current regulators 3 through 5 have a respective terminal 15 for the overvoltage protection device. The constant current regulators 3 to 5 are advantageously embodied so as to have a working range of 9 to 16 volt.

Figure 6:
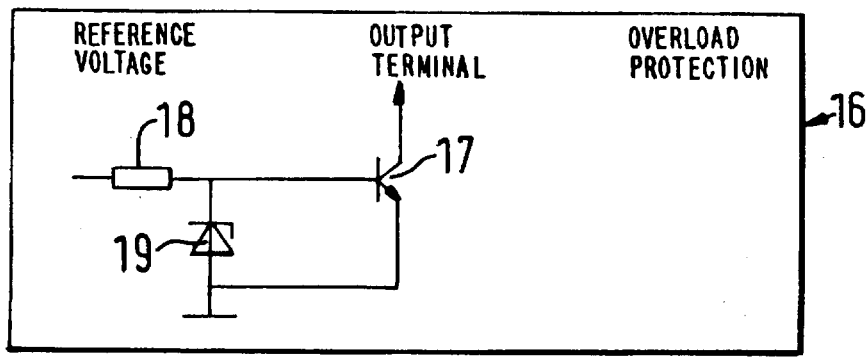
FIG. 6 shows the diagram of an over voltage protection device of the inventive control device according to FIG. 1.

The constant current regulators 3 through 5 have a common overvoltage protection device 16 in order to protect the control member 12 of the respective constant current regulators 3 through 5 from overload. As shown in FIG. 6, the overvoltage protection device 16 has a control member 17 in the form of a transistor. A resistor 18 is connected upstream thereof as well as a protective diode 19. The voltage supply is realized by the resistor 18. The overvoltage protection device 16, as shown in FIG. 1, is connected to the interface 1 of the control device. As soon as the predetermined voltage limit $U_{max}$ is surpassed, the control member 17 of the overvoltage protection device 16 of the respective constant current regulator 3 through 5 is switched such that an overload of the control member 12 of the respective constant current regulator 3 through 5 is prevented.

Figure 7:
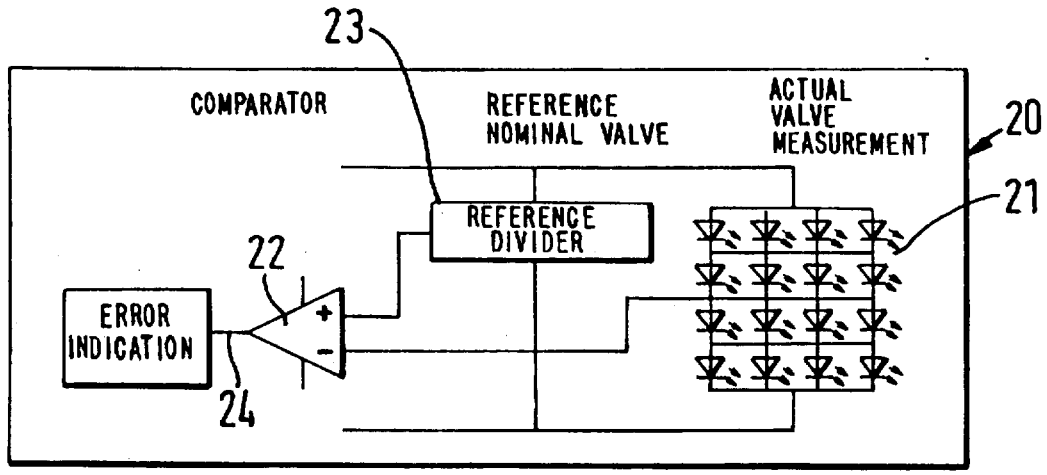
FIG. 7 shows the diagram of a LED failure detection member of the inventive control device according to FIG. 1.

An LED failure detection member 20 is connected via the supply voltage control 2 to the interface 1. It is correlated with the turn signal light 7 and monitors failure of a LED of the turn signal light 7 that is in the form of a LED matrix. FIG. 7 shows the LED matrix 21 which forms the turn signal light 7. The LED matrix 21 is a 4×4 matrix having four rows of four LEDs. At the LED matrix 21 the actual value is determined, i.e., the voltage across the upper and the lower matrix halves is compared by a comparator 22. It detects the actual voltage value of the LED matrix 21 and compares it with the nominal voltage value supplied by the voltage divider 23. When all of the LEDs of the LED matrix 21 are working properly, only a minimal deviation resulting from individual differences between the components can be detected between the voltage of the upper and the lower matrix halves. When one of the LEDs within one matrix half breaks down, the voltage drop in this matrix half will increase. The comparator 22 will then provide a corresponding output signal that is evaluated. This output signal 24 of the comparator 22 is supplied to the interface 1 and an optical and/or acoustic error signal (error indication) will be triggered in the motor vehicle in order to alert the driver that at least one LED within the turn signal light 7 is defective.

Since the LED failure detector member 20 measures the voltage drop across both halves, the LED matrix of the turn signal light 7 can be provided only with a 2, 4, 6 etc. row or column matrix. The failure of an LED in each one of the matrix halves at exactly the same point in time is very improbable.

The disclosed LED failure detection member 20 can also be used for the brake light 6 or the rear light 8.

In order to be able to detect the complete failure of the tail light assembly of the vehicle, for example, by cable breakage or a plug defect, a complete failure detection device 25 is provided (FIGS. 1 and 4) to which the constant current regulators 3 through 5 of the brake light, the turn signal light 7, and the rear light 8 are connected. The output signal 26 of the complete failure detection device 25 is supplied to the interface 1. Via the interface 1 an optical and/or acoustical signal (error indication) can be triggered in the vehicle in order to alert the driver that the tail light assembly of the vehicle is defective.

The complete failure detection device 25 has a comparator 27 (FIG. 4) that compares a reference voltage 28 with an actual voltage value which is measured by the measuring resistor 9 of the respective constant current regulator 3 through 5. When the tail light assembly is defective, the comparator 27 produces the output signal 26 that is supplied to the interface 1.

Figure 3:
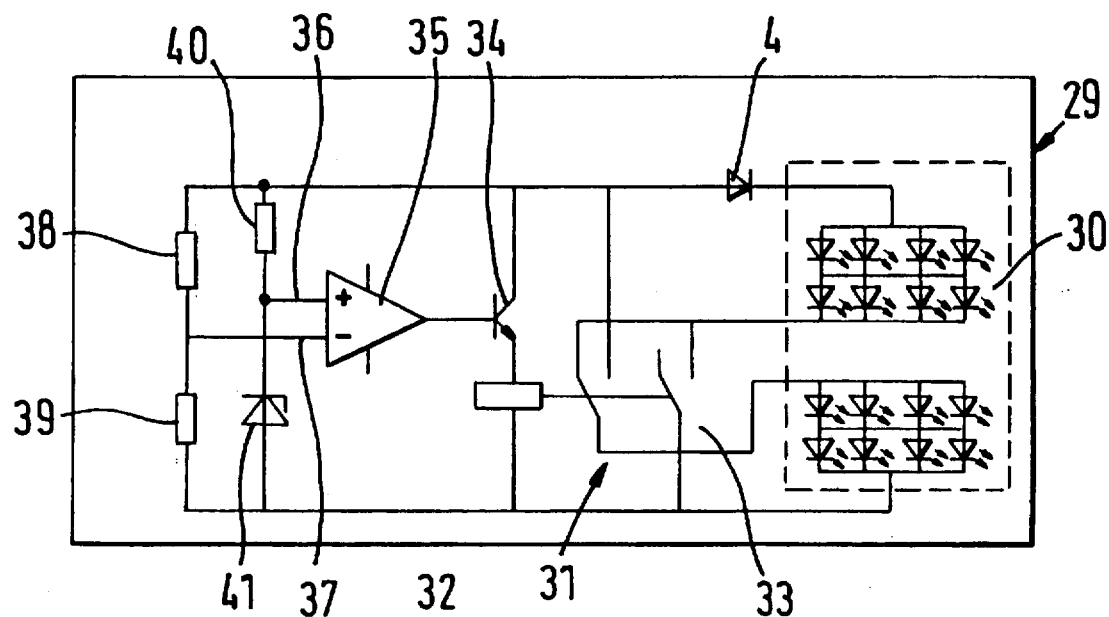
FIG. 3 shows a diagram of a low voltage member of the inventive control device according to FIG. 1.
Figure 4:
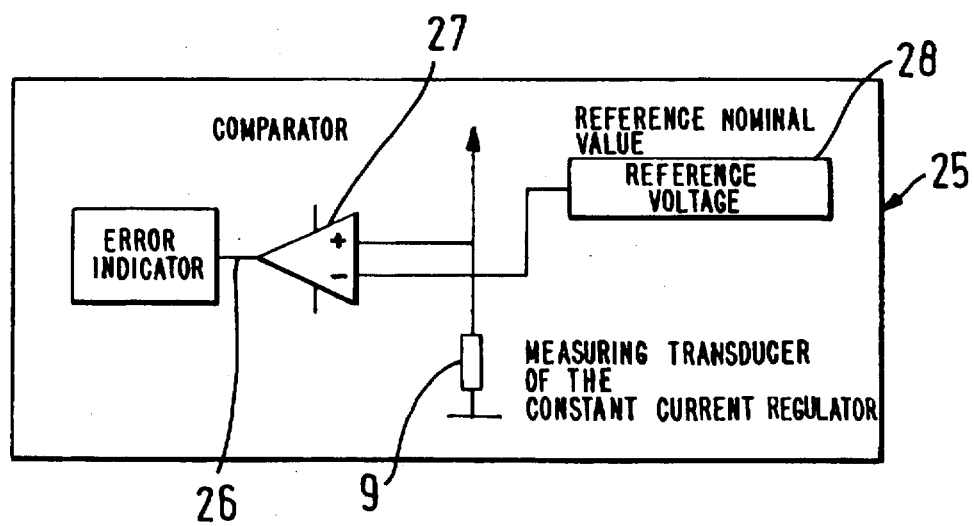
FIG. 4 shows the diagram of a complete failure detection device of the inventive control device according to FIG. 1.

A low voltage step or member 29 is correlated with the rear light 8 which ensures that the rear light 8 is switched below a limit voltage, for example, from a 4 row or column matrix to a 2 row or column matrix. As shown in FIG. 3, the rear light 8 is provided in the form of an LED matrix 30 having connected thereto the relay 31, having a coil 32 and switching contacts 33, and a diode 43. The relay 31 is controlled by the control member 34, preferably a transistor. Upstream of the relay 31 a comparator 35 is positioned which compares the nominal voltage value 36 to a measured actual voltage value 37. The voltage detection is accomplished by a voltage divider comprised of two resistors 38, 39 connected in a serial connection. The nominal value is provided in the form of a resistor 40 and a Z diode 41.

The current control is designed for a working range of preferably approximately 9 volts to approximately 16 volt. In order to be able to operate the rear light 8 up to a voltage of, for example, 6 volt, the exemplary 4×4 matrix 30 can be switched to a 2 row (2×4) matrix. The control device itself is operable down to a voltage of, in the shown embodiment, 5.1 volt. This switching function, if desired, can also be used in connection with the brake light 6 and/or the turn signal light 7. In order to switch the 4×4 matrix 30 of the rear light 8 to a 2 row (2×4) matrix, the relay 31 is switched by the control member 34.

The rear light 8 has two current intensity levels. The rear light may have a tail light function as well as a brake light function. For the common tail light function, a low current is sufficient. For the brake light function, a high current is required because the LEDs for the rear light 8 must be simultaneously controlled with the LEDs of the brake light 7. The current value can be adjusted at the supply voltage divider of the respective constant control regulator 3 through 5. The current intensity level switching can be achieved by parallel connecting of an additional resistor at the voltage divider.

The adjustment of at least two current intensity levels and their control by different signals is also possible for the brake light 6 and/or the turn signal light 7.

The LEDs forming the brake light 6, the turn signal light 7, and the rear light 8 are advantageously arranged in a matrix. This is advantageous because when one LED is defective the other LEDs will still be operating. When this safety feature is not important, the LEDs can be switched in series as shown in FIG. 2a through 2c. FIG. 2a shows the possibility of serially connecting five LEDs and to connect two rows in parallel. FIG. 2b shows four LEDs connected in serial connection while FIG. 2c shows that only two LEDs can also be connected in series.

FIG. 2d through 2f shows examples of matrix circuits of the LEDs. According to FIG. 2d, the LEDs are arranged in a 5×3 matrix, while in FIG. 2 a 4×2 matrix and in FIG. 2f a 2×2 matrix are shown. In the illustrated embodiment the brake light 6, the turn signal light 7, and the rear light 8 are advantageously embodied as 4×4 matrices in order to produce as little as possible loss at the control member 14 of the respective constant current regulator 3 to 5 for a forward current of approximately 2.5 volt per LED. For other operating voltages or LEDs with different forward voltages, it is also possible to use matrix arrangements of 2, 3, 4 or 5 etc. LEDs per row or column.

With the disclosed control device the current for the LEDs of the different lights of the vehicle tail light assembly is maintained at a constant current for a certain voltage range. The current detection within the respective current regulators 3 through 5 is realized by a measuring transducer 9 in the form of a resistor. The current control may have multiple freely selectable current intensity levels, as has been explained in connection with the rear light 8 and FIG. 3. The adjustment of the different current intensity levels is realized by an adjustable dividing ratio of the different resistors 38 to 40 of the low voltage member 29. The current regulators 3 through 5 are protected against overvoltage. When a voltage occurs that surpasses a predetermined upper voltage limit $U_{max}$ the current regulators 3 through 5 are brought into a defined state in which for the LEDs of the brake light 6, the turn signal light 7, and the rear light 8 as well as for the current regulators 3 through 5 no overload risk is present. The rear light 8 can be operated up to a voltage of $U_{min}$, because at a certain switching limit the 4 row or column matrix 30 shown in an exemplary manner for the rear light 8 is switched to a 2 row or column matrix. For example, the operation of the rear light 8 as a 4×4 LED matrix is possible only above voltage of, for example, 3.5 volt above $U_{min}$. The current for the brake light 6, the turn signal light 7, and the rear light 8 is monitored and displayed by the complete failure detection device 25. With the LED failure detection member 20 the voltage across the two halves of the LED matrix 21 is monitored in order to detect failure of individual LEDs. When one LED within the LED matrix 21 is defective, this can be recognized by an increase of the voltage drop at the corresponding matrix half. Since the operating current for the LEDs is maintained constant within a certain voltage range, an optimal light output of the LEDs is obtained. The chip temperature of the LEDs can also be maintained at a very low level so that the LEDs have a long service life.

The specification incorporates by reference the disclosure of German priority document of 197 34 750.9 of Aug. 12, 1997.

The present invention is, of course, in no way restricted to the specific disclosure of the specification and drawings, but also encompasses any modifications within the scope of the appended claims.

What is claimed is:

1. A tail light assembly for a motor vehicle, said tail light assembly comprising:

a rear light, a brake light, and a turn signal light, wherein at least one of said rear light, brake light, and turn signal light is comprised of light emitting diodes (LEDs);

a control device for operating said LEDs at a constant current for a given voltage range;

wherein said control device comprises a measurement transducer and a current regulator measuring an actual current value at said measuring transducer;

said current regulator comprising a comparator for comparing a nominal voltage value to the actual current value measured at said measuring transducer and producing an output signal;

said current regulator having a control member controlled by said output signal of said comparator, wherein said control member controls said LEDs.

2. A tail light assembly according to claim 1, wherein said measurement transducer is a measurement resistor.

3. A tail light assembly according to claim 1, wherein said control member is a MOSFET.

4. A tail light assembly according to claim 1, wherein said control device further includes an overvoltage protection device comprising a control member, a resistor connected upstream of said control member and a protective diode connected upstream of said control member, wherein said resistor provides voltage supply and wherein said control member, when a predetermined voltage limit is surpassed, switches said current regulator such that an overload of said control member of said current regulator is prevented.

5. A tail light assembly according to claim 4, wherein said control member is a transistor.

6. A tail light assembly according to claim 1, wherein said control device comprises a failure detection device.

7. A tail light assembly according to claim 6, wherein said failure detection device compares a nominal current value to an actual current value of said current regulator.

8. A tail light assembly according to claim 1, wherein said LEDs are provided as an LED matrix and wherein said control device comprises an LED failure detection device comprising a comparator comparing a nominal voltage value to actual voltage values measured across an upper half and a lower half of said matrix, wherein said comparator, when one of said LEDs in said upper or lower half is broken, detects a voltage drop and provides a corresponding output signal.

9. A tail light assembly according to claim 8, wherein said control device further comprises a low voltage member for switching, when triggered, said LED matrix of a predetermined number of said LEDs to a sub-matrix of half said predetermined number of said LEDs.

10. A tail light assembly according to claim 9, wherein said low voltage member has a relay for switching.

11. A tail light assembly according to claim 1, wherein said control device is supplied with a control signal from an on-board computer, wherein all components of said control device are supplied with voltage derived from said control signal, and wherein a resting current is $\leq 1$ mA.

12. A tail light assembly for a motor vehicle, said tail light assembly comprising:

a rear light, a brake light, and a turn signal light, wherein at least one of said rear light, brake light, and turn signal light is comprised of LEDs;

a control device for operating said LEDs at a constant current for a given voltage range, wherein said control device comprises at least one current regulator;

said current regulator being switchable to at least two current intensity levels, wherein said control device comprises resistors for switching said at least two current intensity levels;

a voltage divider comprised of two resistors connected in serial connection for measuring an actual voltage value;

a resistor and a Zener (Z) diode determining a nominal voltage value;

a comparator comparing the actual voltage value and the nominal voltage value and providing an output signal;

a control member receiving said output signal and a relay positioned downstream of said control member;

said relay being switched by said control member depending on said output signal for turning on and off the LEDs.

13. A tail light assembly for a motor vehicle, said tail light assembly comprising:

a rear light, a brake light, and a turn signal light, wherein at least one of said rear light, brake light, and turn signal light is comprised of LEDs;

a control device for operating said LEDs at a constant current for a given voltage range;

wherein said control device further includes an overvoltage protection device and a current regulator;

wherein said overvoltage protection device comprises a control member that switches when a voltage limit is surpassed;

wherein said overvoltage protection device is connected upstream of said current regulator and wherein said control member switches said current regulator into a base state when said voltage limit is surpassed.

* * * * *